United States Patent [19]

Dunkley

[11] Patent Number: 4,810,057
[45] Date of Patent: Mar. 7, 1989

[54] THREE-DIMENSIONAL VIEWING GLASSES

[76] Inventor: Kenneth J. Dunkley, 5070 Parkside Ave., Suite 1001, Philadelphia, Pa. 19131

[21] Appl. No.: 853,602

[22] Filed: Apr. 18, 1986

[51] Int. Cl.$^4$ .............................................. G02B 27/22
[52] U.S. Cl. .................................... 350/139; 350/131; 350/143; 350/319
[58] Field of Search ............... 350/139, 133, 144, 319, 350/131, 134, 143; 358/89; 351/46

[56] References Cited

U.S. PATENT DOCUMENTS

| | | | |
|---|---|---|---|
| 459,563 | 9/1891 | Groh | 351/46 |
| 1,236,229 | 8/1917 | Stowell | 351/46 |
| 1,313,262 | 8/1919 | Compere | 351/46 |
| 2,935,910 | 5/1960 | Schmidt | 351/156 |
| 3,029,696 | 4/1962 | Schmidt | 350/146 |
| 3,880,495 | 4/1975 | Roubal | 350/143 |
| 3,980,394 | 9/1976 | Zapf | 350/143 |
| 4,602,856 | 7/1986 | Marks | 351/44 |

FOREIGN PATENT DOCUMENTS 944820  4/1949  France .............................. 350/144
529106  11/1940  United Kingdom ................. 351/46

OTHER PUBLICATIONS

Smith; Warren J., Modern Optical Engineering, pp. 133-135, 1966.

Primary Examiner—Bruce Y. Arnold
Assistant Examiner—Terry S. Callaghan
Attorney, Agent, or Firm—Robert M. Skolnik

[57] ABSTRACT

A three-dimensional viewer employs adjustable diameter pinholes with the distance between the pinholes being adjustable each of the pinholes having an optical axis which is aligned with illocal frames, the spacing between the frames also being adjustable.

9 Claims, 4 Drawing Sheets

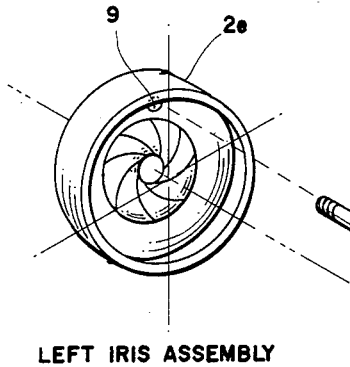
COMMERCIAL IRIS MODIFY BY INSTALLING IRIS LEVER
LEFT IRIS ASSEMBLY
FIG. 3
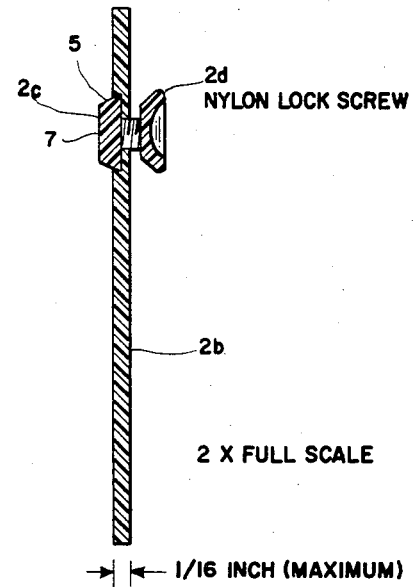
FIG. 4
2 X FULL SCALE
1/16 INCH (MAXIMUM)
FIG. 6A
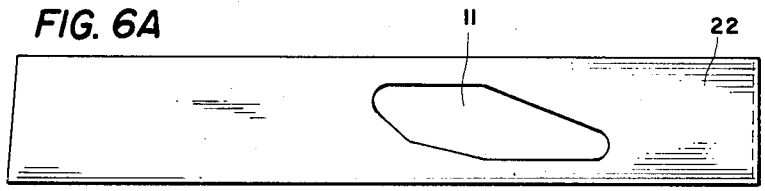
FIG. 6
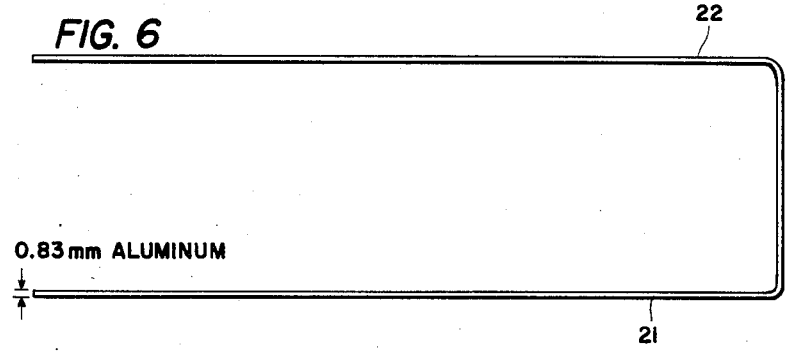
0.83 mm ALUMINUM
FIG. 6B

THREE-DIMENSIONAL VIEWING GLASSES

BACKGROUND OF THE INVENTION

1. Field of the Invention

The present invention relates to devices for viewing two dimensional photographs or images (such as TV or movies) which then appear to the viewer as three-dimensional. The device is light in weight and has three basic adjustments for establishing the stereoscopic effect. These adjustments are for area of view along the optic axis, for interpupillary distance between the eyes of the viewer, and for the optic axes, themselves. As will be described below, the device is seen to enhance the quality of VCR images generated during playback.

2. Description of the Prior Art

Hand held devices to achieve an apparent three-dimensional display from ordinary two dimensional visual data such as photographs or television displays are known in the prior art. Many of these devices operate in accordance with the teachings of the Ames U.S. Pat. No. 2,542,789. That patent discloses that definite and true depth discrimination may be induced by the differentiating dispostion of some characteristic form elements in the respective dioptric images, irrespective of their position on the retina. U.S. Pat. Nos. 607,172; 1,636,450; 2,297,322; and 2,337,139 show the implementations of the Ames description by tilting one image relative to another with mirrors or refractive elements. U.S. Pat. No. 2,986,969 uses both refracting and polarizing elements to achieve the Ames criterion.

U.S. Pat. Nos. 3,460,882 and 4,049,339 show other techniques for creating the effect of 3-D using illocal framing and "window effect", respectively.

The major difference between the present invention and the approaches and devices of the prior art is that the present invention accomplishes surprising and unexpected results without the use of mirrors, lenses, or other optics. In fact, the results of the present invention are achieved without any other moving parts or optical elements.

The net three-dimensional effect in the present invention is the sum of four distinct and separate processes and their respective effects; but only three of the processes are independent. The first of the four processes is the observation that a strong perception of depth can be observed with only one eye (while the other eye is closed) when a two dimensional display is viewed through a tiny aperture of 1 mm or less in diameter (a "pinhole"). The second three-dimensional enhancing effect occurs when the monocular image of the first process (with its increased perception of depth) is viewed with both eyes, binocularly, by the use of a second aperture. The second effect adds to and enhances the first effect. The third process is that of illocal framing which is implemented by employing frames suspended between the display and the observer. However, the use of the illocal framing concepts implemented in the present invention depends solely on the increased depth of field afforded by the use of the pinholes described above.

As discussed in the aforementioned U.S. Pat. No. 3,460,882 by Abrahamson, "illocal framing" is visible framing that is situated in a plane substantially removed from that of the observed picture itself and near the observer. "Illocal framing" is in contrast to standard framing which is local to the picture it enclosed, or is in direct contact with it. The illocal frame appears situated somewhere between the picture and the observer and has the capability of improving the depth effects. The objects in the picture appear to be more life-size.

The three-dimensional viewing glasses implements illocal framing by positioning the frames by adjusting H, the distance from the pinhole to the frames, within the increased depth of focus range determined by the pinhole diameter. The depth of focus depends on the pinhole diameter but also on the distance of the fixation point from the eye, *Physiology of the Eye,* Hugh Davson, Academic Press, N.Y., 1980, Page 486. The display is located at the fixation point. With H either within the depth of focus range or close to it, the frames will be, respectively, in focus or almost in focus along with the display under observation. The requirement of illocal framing, to suspend a frame between the observer and the display, is thus met by the use of a pinhole to extend the depth of focus range and allow the frames to come into the same depth of focus range occupied by the display.

An important visual property of the three-dimensional viewing glasses in the "movie theatre effect". A pair of correctly focuses glasses will give the wearer the distint "viewpoint" that he or she is actually inside a movie theatre where the frames now appear as a full size movie screen appearing to be approximately 100 feet away and the theatre's "ceiling" and "walls" (actually, the inside of the input aperture housings) are in their proper perspective and depth relationships as they would be in a real movie theatre.

This effect is caused by three factors. The increased depth of focus afforded by the pinhole, the illocal framing effect of the picture appearing to be more than life size and the visual isolation from the environment afforded by the ambient light shield. The movie theatre effect is especially important when viewing television displays if optimum results are despred.

The fourth process under consideration, is, I believe, a new way of applying and implementing the principles of the Ames U.S. Pat. No. 1,636,450. That patent recognized that an illusory depth or rotundity is caused by the modification of the direction of the viewing axis of one or both eyes. Typically, this is done with the use of refraction and reflection elements as previously discussed. In my invention, modification of the viewing axis is accomplished by spatially positioning a pinhole which defines the optical axis and thus the location of images on the retina. As the pinhole has a three-dimensional effect all of its own, an important part of my invention is the alteration of the viewing axes of the eyes by positioning the pinholes.

Even without pinholes, any obstruction, such as a finger or a half inch wide by two inch long strip of opaque tape, which is placed in close proximity to the eye and is edged slowly into the eyes' field of view will also change the direction of the viewing axis. This effect is not readily observed when done to one eye alone due to the tendency of the eye to compensate for the restriction in its field by adducting. This is discussed in *Physiology of the Eye,* H. Davson, Academic Press 1980, p. 520. When done symmetrically and slowly to both eyes simultaneously, a surprisingly excellent three-dimensional representation of two dimensional material will be displayed. By symmetric, it is meant that one obstruction is moved simultaneously into the field of view of the right eye from the left side of the right eye while in the left eye, an obstruction is moved into its field of view from the right side of the left eye. Once stereopsis is detected, the position of the obstruction is maintained. Excessive vignetting is apparent at first but can be minimized with practice.

Stereopsis generated in this manner is caused by a temporal disparity. If however, the obstructions in the above example were symmetrically moved from the temple side (i.e., both left and right temples simultaneously) towards the nasal side, a condition of nasal disparity would be created resulting in "locally inverted" or "locally pseudoscopic like" images. These same effects are also apparent when pinholes are used. The main difference between the two stereo producing techniques is the magnitude of the image vignetting. Vignetting is unavoidable in the case of the obstruction technique and non-existant when using the present invention properly focused.

For a given distance between the device (i.e., its pinhole) and the two-dimensional display under observation, the interpupillary distance, $d_i$, is adjusted for maximum light throughput, $d_{mlt}$. Under these conditions, the observed stereopsis is due soleley to the above mentioned effects and not on the teachings of the Ames patent. When $d_i$ is equal to $d_{mlt}$, it is assumed that the axial directions of the eyes are equal to the axial directions that would occur if the two-dimensional display were viewed normally without the three-dimensional viewing glasses of the invention. However, by increasing the interpupillary distance beyond $d_{mlt}$, a modification in the direction of the viewing axes of one or both eyes will occur. Under these conditions, the Ames teachings will now apply and the observed stereopsis will increase dramatically with increasing $d_i$ until a condition analogous to hyperstereopsis is reached. Though not necessary, the frames should be readjusted for each setting of the interpupillary distance, $d_i$. Adjusting the frames enables the principles of illocal framing. Counteracting the increasing stereopsis as $d_i$ is increased are increased image vignetting and a reduction in light throughput for larger values of $d_i$ greater that $d_{mlt}$.

In actual use, knowledge or determination of $d_{mlt}$ is not required for the correct use or adjustment of my invention. however, $d_{mlt}$ may be determined by looking through the device with its pinholes wide open. While fixating on the display of interest, $d_i$ is adjusted to that size which gives a normal flat display. With the device so adjusted, the point of fixation is said to lie on the horopter and for a given fixation distance will simulate corresponding retinocortical elements.

The selected value of $d_{mlt}$ may be verified by closing the pinhole down to about 1 mm and adjusting $d_i$ for the minimum three-dimensional effect without image "inversion", This process is hindered by the presence of monocular depth perception introduced by the small 1 mm diameter pinhole. Values of $d_{mlt}$ selected by the latter method are often within ±0.6 mm of the first method.

On the preferred embodiment of my invention, the maximum diameter when wide open was 4.7 mm. This diameter was small enough to be present in the observer's peripheral field of view and cause stereopsis with vignetting as was noted above to occur when an obstruction is symmetrically introduced into the peripheral field of view. Centering the irises within the wide open pinholes will eliminate this extraneous stereopsis, if present.

For $d_i$ less then $d_{mlt}$ contiguous portions of the observed image will appear "inverted" or "locally pseudoscopic" wherein image elements appearing in the foreground when $d_i$ is greater that $d_{mlt}$ will now appear in the background and vice versa. This effects is not observed in television displays due to their relatively low spatial resolution. This local pseudoscopic effect can be shown to exist even when the photographic display under consideration consists only of contiguous color differences with no perspective information.

Of the three independent processes under discussion, the pinhole process plays the key role. This is because the pinhole process is in effect at all times, while the other two processes, Ames and illocal framing, are not. In addition, the pinhole process allows the "seamless" integration of all three independent processes without the use of optical elements.

The small pinhole aperture selected achieves a number of beneficial results in the invention. The pinhole increases the observer's depth of focus thereby reducing the accommodating capability of the single eye. Elimination of accommodation results in improved monocular depth sensation.

The pinhole aperture increases the sharpness of any given display in addition to reducing noise in television images because of five interrelated factors which include:

1. The fact that light passing through a pinhole is, in a sense, automatically focused where the focal length of the pinhole is defined as the square of the diameter of the pinhole divided by the wavelength of the transmitted light. See M. Young, PInhole Optics, *Applied Optics*, Vol. 10, No. 12. Dec. 1971, p. 2764;

2. The increase in depth of focus due to the reduction in pupil size;

3. The spatial smoothing (i.e. low pass optical spatial filtering) of the television image caused by restricting the optical spatial frequencies entering the eye by decreasing the diameter of the exit pupil (i.e., the pinhole). This cut off eliminates those spatial frequencies responsible for high resolution image detail (i.e., video noise). With these high frequency components removed, their associated noise will be filtered components removed, their associated noise will be filtered from the image recorded on the retina;

4. The measured increase in the response of the Modulation Transfer Function of the refractive optics of the human eye as the pinhole is closed down from its wide open position (of about 5 mm) to a limiting diameter of 3 mm. Ian Overington, *Vision and Acquisition,* Pentech Press, London/Crane, Russak & Co. Inc., N.Y., 1976, p. 12;

5. A reduction in the veiling glare entering the eye.

The three-dimensional viewing glasses improves the overall appearance of a color television display and is especially effective during the playback of recorded VCR (video cassette recorder) images. Observing a television display through the device results in a visual smoothing (i.e., a spatial averaging) of the image where television raster lines and finely structured time dependant white speckled noise are substantially reduced. The reduction of this noise results in an apparent improvement in the resolution of the video display in spite of an objectively measured loss in resolution. It has been mentioned (Overington, p. 188) that with noisy pictorial displays and television pictures, blurring results in an increase in the detail information visualized in the display. Television is particularly sensitive to this effect.

An actual loss in resolution can be objectively measured by illuminating a standard resolution target and observing it from a distance of 1.6 meters. In this test, lines separated at 1 mm could be easily resolved without the pinholes but could not be resolved with the 0.8 mm diameter pinholes in place.

When located in as close proximity to the cornea as possible, the pinhole will largely negate the use of the viewer's cornea and lens. However, some residual focusing (or accommodation) is still possible by the eye's lens (Hennessy, R.T., Iida, T., Shina, K., Leibowitz, H.W., "The Effect of Pupil Size on addommodation", *Vision Res.*, Vol. 16, pp. 587–589, 1976).

Pinhole images are inverted and at a fixed distance from the pinhole to the retina, focusing is accomplished by closing the pinhole to improve the depth of field. Because of the five factors under discussion, persons wearing mild prescription eyeglasses who remove them to use the three-dimensional viewing glasses of the invention may experience a significant improvement in normal visual resolution over that received had they worn no eyeglasses. In most instances, these viewers will experience and improvement in normal visual resolution equal to that received with their own prescription eyeglasses. For one observer with +0.5 diopter corrective lenses, this optimum resolution occurred at a pinhole diameter of 1.1 to 1.2 mm at a 1.6 meter viewing distance. The object viewed was a standard test target. Smaller pinhole diameters worsened the resolution at this 1.6 meter viewing distance. However, this was not true for a television image viewed at this same distance. In this instance, the apparent resolution of the video image continues to improve as the pinhole is reduced. Optimum video resolution was obtained with a pinhole diameter of 0.8 to 0.9 mm.

Finally, the pinholes allowed the placing of an optically focused frame in front of the display in connection with the illocal framing techniques discussed above in U.S. Pat. No. 3,460,882.

For any given display, the quality of the perceived three-dimensional effect will depend on the specific requirements of the display including the display's brightness, resolution, viewing distance and image content.

In general, sharp lithographic or photographic material produces the most dramatic three-dimensional results. Television produces good results, while normal movie screen illumination levels are not sufficient for adequate operation of the three-dimensional viewing glasses. This may be corrected in principle by making provisions to increase the screen illumination levels.

Illocal framing is a necessity when viewing television displays. It can be dispensed with, however, when observing photographic of printed (lithographic) material.

When observing a 19 inch diagonal screen color television close up at viewing distances of approximately 36 inches, a small pinhole (0.70 mm) is desirable. If this same image is viewed at a distance of say 63 inches, a pinhole setting of 0.90 mm is found to be more suitable. More importantly, at either viewing distance, varying $d_i$ has virtually no effect on the resulting television image; the Ames process results in no discernable stereopsis at normal TV resolution specifications.

Typically, a small pinhole is required when observing photographic or printed material close up (15–34 inches). However, the size of this pinhole can vary between 1.10 and 0.75 mm depending on the available illumination, the resolution in the image, and the specific viewing distance.

Suitable illumination levels for pictorial material can be established by illuminating the material with a 100 to 150 Watt household light bulb positioned to eliminate specular glare at a distance of about 12 inches from the display material.

The best pinhole diameter for a standard resolution (0.20 mm dot separation) lithographic print observed at a viewing distance of 63 inches was found to be around 1.5 mm. Different results should attend different observers.

The invention can be used as a sports or scenic viewing glass since the need to refocus the eye for distant or near objects being observed is eliminated. A field of view of 30 degrees attends this mode of operation. This mode substantially reducers viewer fatigue. It is noted that the invention's increased depth of field allows ordinary objects to be examined, without fatigue, at distances closer than the normal viewing distance of 25 cm.

The principle object of the present invention is the provision of a device which results in a three-dimensional viewing system posessing a degree of stereopsis judged comparable to normal stereoscopic photography which uses two dissimilar images of the same object.

Another object of the present invention is the construction of a device of the simplest possible design employing no transmissive or reflective optical elements which add to costs, complexity, and to interference since such elements are sources of noise and are difficult to use.

A further object of the present invention is to produce a device of the class described which has extreme optical clarity.

Another object of the present invention is to provide the viewer with increased spatial resolution when the invention is used to view television.

A further object of the invention is to provide a two dimensional object with a three-dimensional perspective without the need for the viewer to wear their normal eyeglasses.

Another object of the invention is the provision of an optical device which substantially reduces playback noise in recorded VCR images resulting in an increase in the observed signal-to-noise ratio in these images when same are viewed through the invention.

A further object of the invention is the provision of a stereoscopic viewer which can be used to examine objects which are both nearby and distant without the fatigue caused by continual changes in focusing.

An additional object of the invention is the provision of a 3-D viewer which can be used to examine objects located extremely close to the viewer without the need to refocus and without the resultant fatigue.

Another object of the present invention is the provision of a two dimensional to three dimensional viewer which is light in weight to allow for comfortable mounting on the viewer's head over the eyes in the manner of goggles.

A further object of the invention is the provision of a device which provides apparent three-dimensional visual displays using ordinary two dimensional visual information such as photographs and television displays.

Another object of the invention is the generation of three-dimensional effects from two dimensional displays without the necessity for any special prerecorded visual or other information to create the 3-D effects.

These as well as further objects and advantages of the invention will become apparent to those skilled in the art from a review of the specification and the accompanying drawings in which:

FIG. 3 is a perspective view of the iris adjustment aperture mechanism of FIG. 1;

FIG. 4 is a partial section view of a portion of the adjustment mechanism of FIG. 2;

Figure 1:
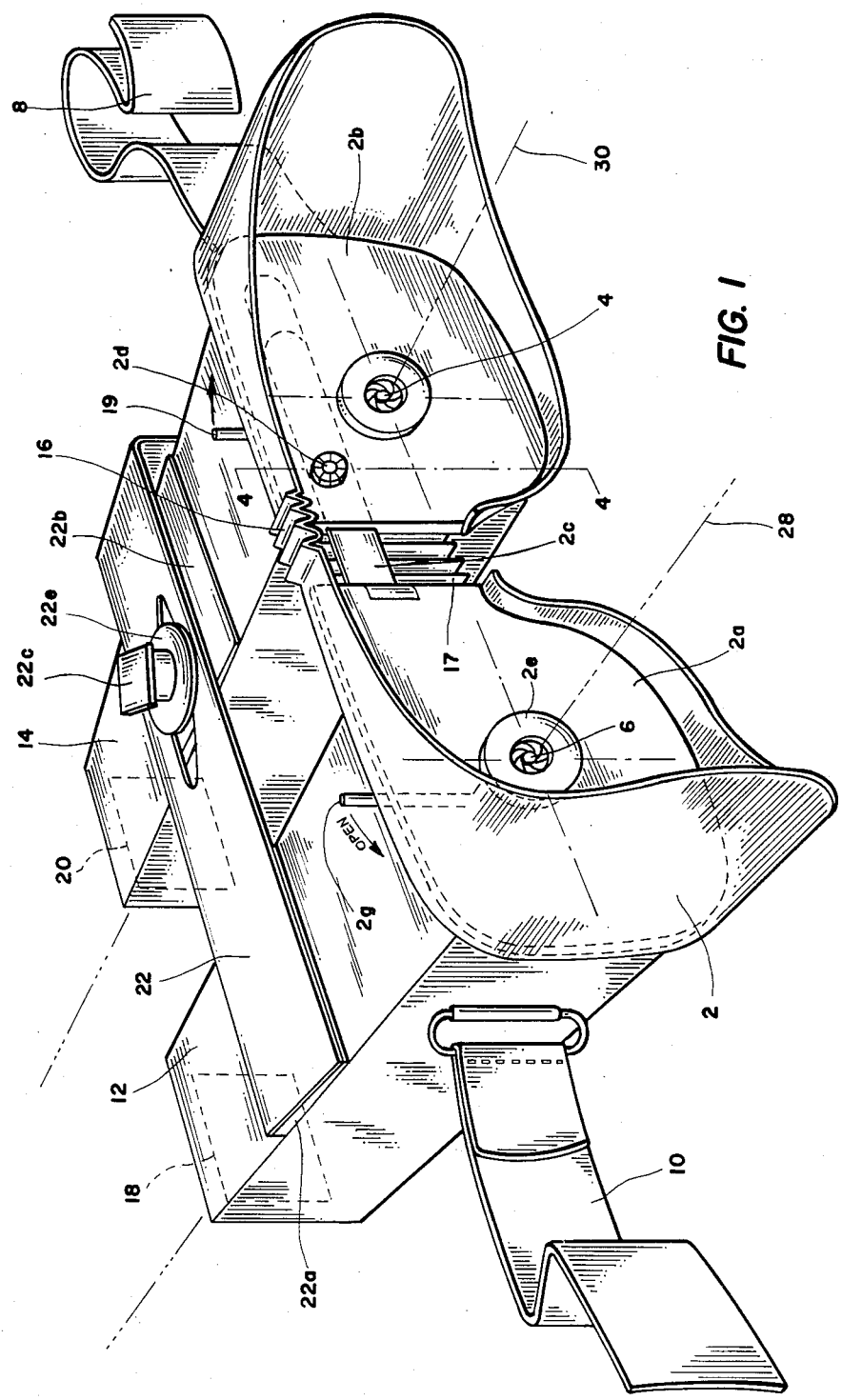
FIG. 1 is a perspective view of my invention.
Figure 7:
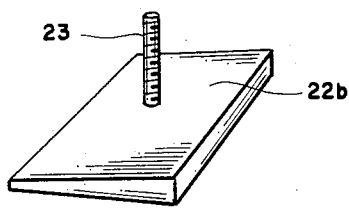
Figure 7A:
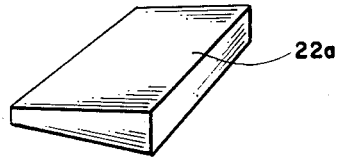

FIGS. 6, 6A, and 6B are side, top and end views, respectively, of the mounting frame of FIG. 1; and FIGS. 7 and 7A are perspective views of the mounting brackets of FIG. 1.

The preferred embodiment of my invention is shown in FIG. 1 having a goggle shaped ambient light shield 2 for overfitting the wearer's eyes. The central portion of the shield 2 is formed with two accordion shaped folding portions 16 and 17. Portion 16 has folds along the top of the light shield 2 and portion 17 contains accordion folds along the front of the ambient light shield 2. The accordion folds 16 and 17 preserve the light shielding integrity of the light shield 2 as an adjustment is made laterally to widen or narrow the shield to adjust for the interpupillary distance between the eyes of the wearer. The device also includes two eyepiece portions 2a and 2b connected to one another via a hinged connecting dovetail portion 2c. Each eyepiece portion 2a and 2b is coupled to a tapered rectangular spacing element 12 and 14. Frames 18 and 20 are formed in the ends of the spacing elements 12 and 14, respectively.

Adjustable diameter aperture irises 4 and 6 are formed in the respective eyepiece portions 2b and 2a, respectively. These adjustable aperture irises form the "pinholes" discussed above and each diameter is adjustable via respective adjusting levers 2g for iris 6 and 19 for iris 4. Each of the irises 4 and 6 are supported in circular mounting frames 2f and 2e, respectively. The central apertures of each pinhole as well as the center of each of the spacers 12 and 14 and the frames 18 and 20 are located along optical lines of sight or axes 28 and 30.

Straps 8 and 10 are affixed to the rectangular spacers 12 and 14 for mounting the device around the wearer's head and over the wearer's eyes. A U-shaped support 22 holds each of the rectangular spacers 12 and 14 is place and includes a manual adjusting mechanism to set the spacing between frames 18 and 20. As best shown in FIGS. 6, 6A and 6B, the support 22 is a thin U-shaped support having an irregulary shaped apertures 21 and 11 in the top and bottom surfaces thereof. These apertures permit adjusting studs and nuts to be employed to firmly lock the spacers in place after adjustment.

Returning to FIG. 1, the portion of support 22 which overfits spacer 12 is adhesively affixed to the spacer via a wedge shaped mounting bracket, 22a. Similarly, wedge shaped brackets 22b are affixed to spacer 14 but are not fixedly mounted to support 22. Instead, brackets 22b have a threaded post formed integrally therewith for receiving an adjusting nut. In FIG. 1, the nut is designated 22c and a washer, 22e. As shown in more detail in FIGS. 7 and 7A, brackets 22b and 22a are wedge shaped to compensate for the tape on spacers 12 and 14. Bracket 22b has a threaded post 23 formed thereon which protrudes through apertures 21 and 11 in the surfaces of the mounting support, 22. As a nut/washer (22c/22e) is used on both the top and the bottom surfaces of support 22, secure and stable support and locking is provided. As will be described in greater detail in connection with FIG. 2, below, the lateral position of eyepiece portions 2a and 2b along the connector 2c is locked in place with a nylon lock screw, 2d.

Figure 2:
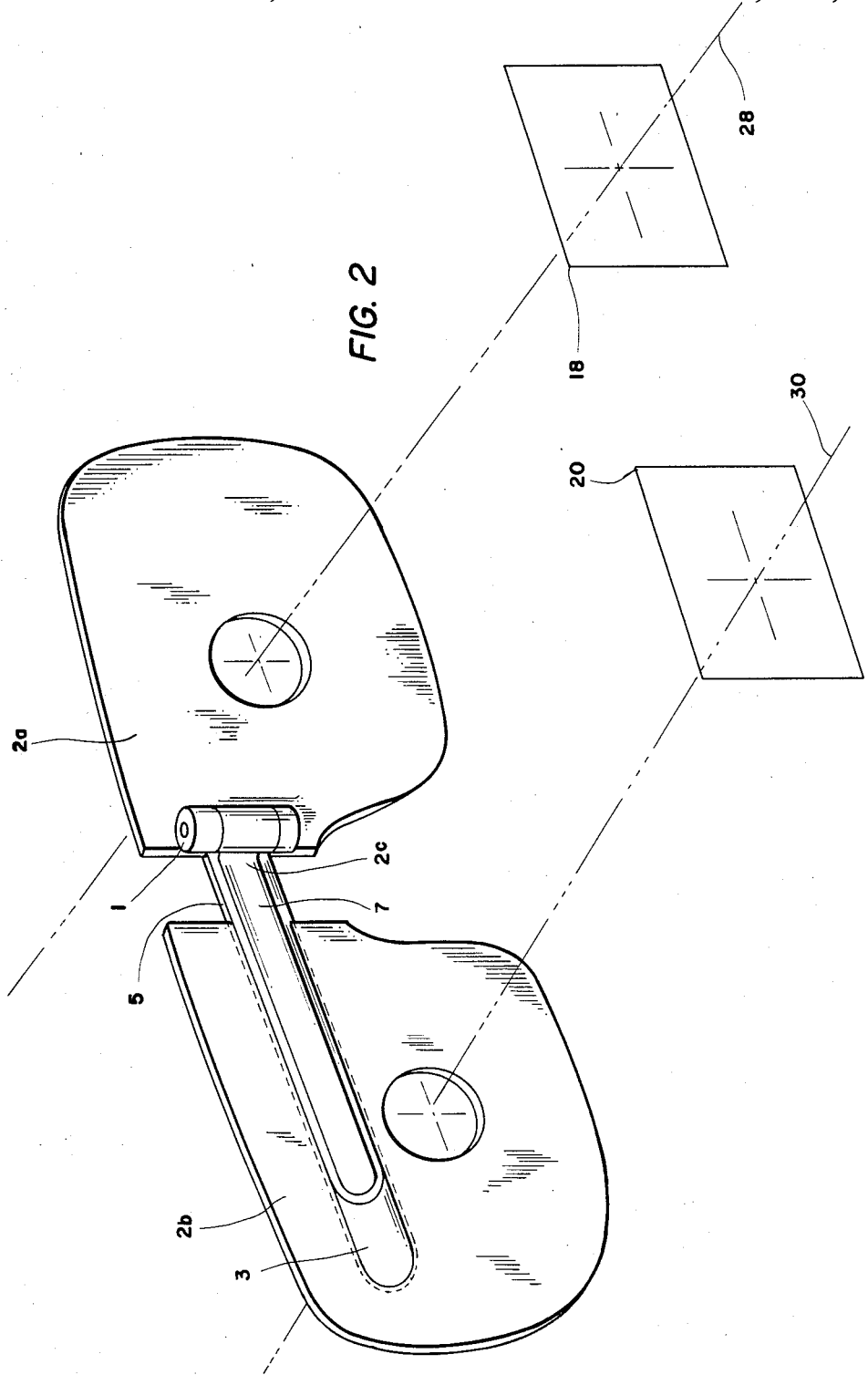
FIG. 2 is a perspective view of a portion of the preferred embodiment shown in FIG. 1 being the interpupillary adjustment mechanism of my invention.

FIG. 2 shows the mechanism employed in my invention to adjust the three-dimensional viewing glasses for interpupilary distance of the wearer. A hinge 1 is affixed on the eyepiece portion 2a. The moveable arm of the hinge 1 is coupled to connecting tongue 2c. The connecting tongue 2c dovetails into eyepiece portion 2b. Specifically, a channel 5 is formed into and about the periphery of tongue 2c. This channel 5 is formed by producing a raised portion 7 on the tongue 2c. The tongue slidably interfits into and dovetails with with an undercut portion 3 cut into eyepiece 2b. Portion 3 overfits channel 5. After adjustment, the lock screw 2d holds the tongue in place against portion 3 in eyepiece 2b.

FIG. 3 shows the simple adjustment mechanism employed for opening and closing the aperture of the iris. The iris 2e is a commercially available mechanism which is sold by The Ealing Corp. Maine, under Model No. 223305. A lever, 2g, is inserted into the adjusting aperture 9 in the iris 2e. This lever is securely affixed into the aperture 9 and one lever each is provided for each iris 2e and 2f.

FIG. 4 is a section view of the eyepiece 2b taken along the line 4—4 in FIG. 1. As shown in FIG. 4, the lock screw 2d bears against the tongue 2c. The shape of the cut 5 forming the raised portion 7 in tongue 2c is also shown. As will now be clear, it is the dovetail effect of the cut 5 being held in place by a similar complementary cut in eyepiece 2b which permits the sliding adjustment between the two eyepieces and between the two irises, 2e and 2f.

Figure 5:
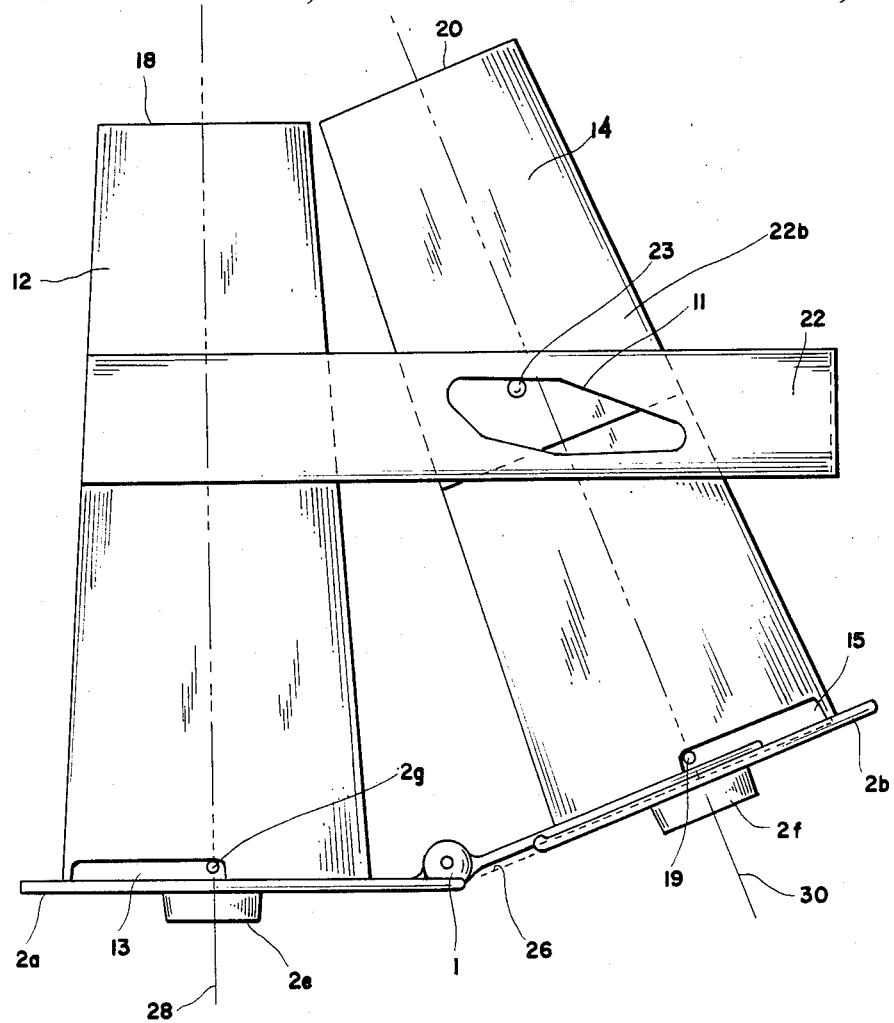
FIG. 5 is a diagrammatic top view of the preferred embodiment of FIG. 1 with adjustments being made for use of the device.

FIG. 5 is a top view of the viewing glasses of FIG. 1 where the adjustment of the illocal frames 18 and 20 is shown. In FIG. 5, the spacers 12 and 14 each have a slot, 13 and 15, respectively, cut therein to allow the iris adjusting levers 2g and 19 to protrude up from each of the irises through the spacers so that the levers are accessible for use. The eyepiece 2b is rotatable about the hinge 1 when the locking nuts 22c and washer 22e at the top and bottom of support 22 are disengaged. Apertures 11 and 21 cut into the top and bottom surfaces of support 22, respectively are configured such that the threaded posts 23 (FIG. 7) ride in close proximity or against the wall of each aperture. It will be understood that the adjusting nut and washer for the bottom of support 22 is not shown.

As can now be understood, the four processes discussed above are implemented in the preferred embodiment to produce a steropsis for the viewer. In operation, the device is mounted on the user's head over the eyes and secured in place. The pinholes 2e and 2f are then adjusted for the distance between the user's eyes using the locking nut and the tongue 2c. The apertures 4 and 6 are then adjusted using the levers 2g and 19 and the distance between illocal frames 18 and 20 is adjusted while the user is observing an object to created the desired degree of stereoscopic effect. The frames are located by moving spacers 12 and 14 such that the frames 18 and 20 appear to "touch" in the user's field of vision.

Modifications to the foregoing may be made without departing from the scope and spirit thereof and the invention for which letters patent is desired to be obtained is set forth in the appended claims.

I claim:

1. A device for creating a three-dimensional effect from viewing two dimensional objects said device comprising: binocular support means, first and second adjustable diameter pinhole apertures mounted in said binocular support means, each of said apertures having an optical axis; first and second optical frames centrally located on said optical axes and connected to said binocular support means spaced from said pinhole apertures at a distance enabling the viewer to focus on said frames, and means mounted on said frames for adjusting the distance and the interoptic angle between said frames to bring said frames and said pinholes into optical alignment with a visual point of fixation.

2. Apparatus for viewing objects with illocal framing comprising: a binocular frame, two adjustable diameter pinhole means mounted in said binocular frames for varying the depth of field of said apparatus, two matched illocal frames mounted at such a distance from said pinhole means to enable the viewer to focus on said frames, means mounted in said binocular frame for adjusting the distance between said pinhole means for modifying the direction of the viewing axes of the eyes, said binocular frames having first and second elongated sections which provide means for shielding extraneous light from the viewer's eyes for increasing interscenic visual contrast, and means to adjust the distance tne interoptic angle between said first and second elongated sections to bring said illocal frames and said pinhole means into optical alignment with a visual point of fixation.

3. An apparatus for viewing objects and creating a three dimensional effect for the viewer said apparatus comprising:

first and second adjustable diameter optical pinholes for fitting over and in front of the viewer's eyes for varying the depth of field of said apparatus; first and second frames coupled to said pinholes and spaced a distance from said pinholes and along an optical axis of said pinholes to enable the viewer to focus on said frames; means coupled to said pinholes for adjusting the distance therebetween for modifying the direction of the viewing axes of the eyes; and means coupled to said first and second frames for adjusting the distance and the interoptic angle therebetween.

4. A stereoscopic viewer comprising: first and second adjustable aperture pinholes, first and second eyepieces providing a mounting for said first and second pinholes; first and second rectangular spacers mounted in front of said pinholes and affixed to said eyepieces; first and second illocal frames affixed to said spacers opposite said pinholes at a distance therefrom sufficient to enable the viewer to focus on said frames; means for connecting said eyepieces which enables said eyepieces to move laterally with respect to each other for modifying the direction of the viewing axes of the eyes, and to permit said eyepieces to rotate relative to each other, the rotation of said eyepieces causing said illocal frames to move closer to each other to bring said frames and said pinholes into optical alignment with the visual point of fixation; and means to lock said spacers and said eyepieces in their desired relative positions.

5. The stereoscopic viewer of claim 4 wherein said eyepiece connecting means includes a tongue affixed to a hinge; said hinge being mounted on said first eyepiece; and said second eyepiece including a channel formed therein to dovetail with said tongue in slidable engagement therewith.

6. The viewer of claim 5 wherein said locking means includes a first locking means mounted in said second eyepiece for holding said tongue firmly in said channel; and a second locking means affixed to said spacers for securing said spacers after said frames are in the desired position.

7. A method of effecting three-dimensional appearance from two dimensional media comprising the steps of:
 a. viewing the media through a small aperture for each eye;
 b. placing first and second illocal frames, each located a fixed distance from said small apertures, within the depth of field of the said small apertures, for improving the visual sensation of depth effects;
 c. adjusting the diameter of the apertures for varying the depth of focus of the field of view in order to bring the frames into focus to provide illocal framing and to control brightness;
 d. viewing the media through said apertures and said illocal frames;
 e. adjusting the spacing between said apertures for spacing distances greater than or equal to the distance between the eyes to modify the direction of the viewing axes of the eyes;
 f. adjusting the spacing between said illocal frames to bring the image of said first and second illocal frames into visual coincidence; and
 g. repeating said adjustment steps as required to obtain the desired degree of stereopsis.

8. The viewer of claim 7 wherein said second locking means includes a support affixed to said first spacer and manually lockably affixed to said second spacer said support having an aperture formed therein for receiving a lock nut assembly.

9. Apparatus for viewing objects to effect stereopsis comprising: a binocular frame, two adjustable diameter pinhole means mounted in said binocular frame for varying the depth of focus of said apparatus, means mounted in said binocular frame for adjusting the distance between said pinhole means to modify the direction of the viewing axes of said apparatus, first and second rectangularly shaped elongated sections mounted along the optical axis of said pinholes, means for shielding extraneous light from reaching the eyes of the viewer, illocal frame means formed on said sections for improving the depth effects of said apparatus, and means to adjust the distance and interoptic angle between said first and second sections to bring said illocal frames into focus and to bring said frames and said pinholes into optical alignment with the visual point of fixation.

* * * * *